United States Patent
Harrison et al.

(10) Patent No.: US 7,308,707 B2
(45) Date of Patent: Dec. 11, 2007

(54) COMMUNICATION AND AUTHENTICATION OF A COMPOSITE CREDENTIAL UTILIZING OBFUSCATION

(75) Inventors: Keith Alexander Harrison, Chepstow (GB); Brian Quentin Monahan, Sodbury (GB); Marco Casassa Mont, Gifford (GB); Richard Brown, Cottrell (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 831 days.

(21) Appl. No.: 10/023,846

(22) Filed: Dec. 21, 2001

(65) Prior Publication Data

US 2002/0108061 A1   Aug. 8, 2002

(30) Foreign Application Priority Data

Dec. 22, 2000   (GB) ................... 0031420.3

(51) Int. Cl.
*H04L 9/32* (2006.01)
(52) U.S. Cl. ............... 726/5; 726/18; 726/19; 705/76; 705/78; 380/278
(58) Field of Classification Search ............ 713/157, 713/150, 165; 726/5, 18–19; 709/201, 216, 709/229, 225; 705/56, 76, 78; 380/277–278
See application file for complete search history.

(56) References Cited

U.S. PATENT DOCUMENTS

| 5,497,421 | A | * | 3/1996 | Kaufman et al. | ........... 713/156 |
| 5,497,422 | A | * | 3/1996 | Tysen et al. | ................ 713/157 |
| 5,740,361 | A | * | 4/1998 | Brown | ......................... 726/5 |
| 5,745,574 | A | * | 4/1998 | Muftic | ....................... 713/157 |
| 5,757,920 | A | * | 5/1998 | Misra et al. | ................ 713/158 |
| 6,131,090 | A | * | 10/2000 | Basso et al. | .................. 706/23 |
| 2002/0031230 | A1 | * | 3/2002 | Sweet et al. | ................ 380/278 |
| 2002/0138728 | A1 | * | 9/2002 | Parfenov et al. | ............ 713/170 |

FOREIGN PATENT DOCUMENTS

| WO | WO95/23468 | 8/1995 |
| WO | WO98/10381 | 3/1998 |

OTHER PUBLICATIONS

Alfred J. Menezes et al., Handbook of Applied Cyrptography, CRC Press, 1997, p. 39.*

* cited by examiner

*Primary Examiner*—T. B. Truong

(57) ABSTRACT

A method of communication is such that a first party (30) communicates a composite credential (54) across a distributed electronic network (44) to a second Party (32). The composite credential (54) includes a plurality of credentials (46-52).

14 Claims, 1 Drawing Sheet

COMMUNICATION AND AUTHENTICATION OF A COMPOSITE CREDENTIAL UTILIZING OBFUSCATION

BACKGROUND OF THE INVENTION

1. Field of the Invention

The present invention relates to methods of communication and to composite credentials.

2. Brief Description of the Related Art

In communication across a distributed electronic network such as the internet, particularly (but not exclusively) in a business to business communication, there may be many separate business to business communications required for a single action or transaction.

FIG. 1 of the drawings that follow illustrates such a known communication method and system. In FIG. 1 there is shown a first party 2 in communication with a set 4 of other enterprises comprising a second party 6, third party 8, fourth party 10, fifth party 12 and sixth party 14, respectively some of which are in communication with each other as indicated by the arrows in FIG. 1. Communication between the first party 2 and the set of other enterprises 4 is across the internet (indicated schematically at 16). Communication between the second to sixth parties 6-14, respectively may be across the internet, but could also be across a wide area network (WAN) or local area network (LAN). Typically, each party will be an enterprise such as a business.

If the first party 2 wishes to communicate reliably with the second party 6, for instance to carry out a financial transaction it is necessary for first party 2 to provide a credential 18 to the second party 6.

A credential is a data structure provided to the bearer for a purpose with some acknowledged way to verify the bearers right to use the credential.

In the digital environment a credential will generally be an electronic document which has a defined structure known to all involved parties. Credentials are issued by an authority (sometimes referred to as a trusted source). Typically the credential has additional data (i.e. a digital signature) that "ties" the document content to the issuer.

Typically a credential will comprise information concerning the bearer (perhaps identity details or financial records) and will be digitally signed by a trusted source. Verification is achieved by decryption of the digital signature. Generally a credential performs the functions of authentication and authorization.

The purpose of the credential is to identify the user and/or to validate a transaction between parties, which transaction may be the transfer of information which needs to be validated. However, for the second party 6 to complete the transaction it needs (in this example) to communicate with the third and fourth parties 8, 10 respectively. The third and fourth parties 8, 10 respectively each communicate separately with fifth party 12, which in turn communicates with sixth party 14. Each party 6-14 may require a different credential from first party 2 to validate its part of the transaction. In this example, third party 8 requires a second credential 20 from first party 2 and fifth party 12 requires a third credential 22 from first party 2. Thus, third party 8 and fifth party 12 need to communicate separately with a first party 2 to obtain the second and third credentials 20, 22 respectively. This, therefore, is a multi-layer communication. First party 2 will not necessarily be aware of the need at the beginning of the transaction for the third and fifth parties 8, 12 respectively to be involved so extra validation and credential transfer may be required.

To undertake such a transaction, data continuously has to be sent back and forth between the involved parties. This increases the possibility of an external attack. To minimize the risk of an attack, data has to be protected and verified by each party of a transaction at each step, which reduces the overall performance.

Moreover, such a method of communication requires many separate communications between the parties. Specifically, the first party is involved in several communications which is undesirable.

It is an aim of preferred embodiments of the present invention to improve performance in such communication environments.

BRIEF SUMMARY OF THE INVENTION

According to the present invention in a first aspect, there is provided a method of communication, the method comprising the steps of a first party communicating to a second party a composite credential across a distributed electronic network which composite credential comprises a plurality of credentials.

A credential for the purpose of the present invention is a data structure provided to the bearer for a purpose with some acknowledged way to verify the bearers right to use the credential.

Suitably, second party communicates at least part of the composite credential to a third party. The second party may modify the received composite credential before communicating it to the third party. The modification may be by addition to and/or removal from the composite credential. Suitably, the second party communicates the received composite credential to the third party.

According to the present invention in a second aspect, there is provided a composite credential for communication of credentials across a distributed electronic network, the composite credential comprising a plurality of credentials.

The use of such a composite credential can reduce the number of communications required in a multi-layer transaction.

Suitably, at least one credential in the composite credential is obfuscated. Obfuscation is a process whereby data is rendered not easily intelligible to an unauthorized recipient. Generally, obfuscation will be by encryption but may also be by data compression or in other way. Suitably, a plurality of credentials in the composite credential is obfuscated. Suitably, all credentials are obfuscated within the composite credential. Suitably, different obfuscation is used for at least two credentials in the composite credential. Suitably, different obfuscation is used for each obfuscated credential in the composite credential. Suitably, the obfuscation comprises asymmetric encryption.

In the above method of communication, suitably the first party communicates to the second party the composite credential, which composite credential is at least partly obfuscated, and the second party de-obfuscates a relevant credential.

Suitably, the composite credential comprises a first credential and a second credential in which the second credential is enveloped by the first credential. Such a composite credential can be used to dictate the order in which the credentials within the composite credential can/must be read and therefore a workflow.

In a method of communication, suitably a first party communicates to a second party a composite credential according to the preceding paragraph, which composite credential is de-obfuscated by the second party thereby to obtain the first credential and a partly de-obfuscated second credential, which party de-obfuscated second credential is communicated by the second party to a third party. Suitably, the third party de-obfuscates the partly de-obfuscated second credential.

Suitably, the composite credential is obfuscated. Suitably, the obfuscation comprises an asymmetric encryption.

Suitably, in a composite credential in which a plurality of credentials is variably obfuscated, a second party de-obfuscates at least one credential and communicates to a third party at least one obfuscated credential from the composite credential. In this way credentials can be sent to be readable only by the party or parties for which they are intended.

Suitably, at least one credential is digitally signed. Suitably, a plurality of credentials is digitally signed. Suitably, all credentials in the composite credential are digitally signed. Suitably, the composite credential is digitally signed.

Suitably, the distributed electronic network is the internet.

The composite credential of the first aspect of the invention may be according to the second aspect of the invention.

BRIEF DESCRIPTION OF THE DRAWINGS

The present invention will now be described, by way of example only, with reference to the drawings that follow; in which.

DETAILED DESCRIPTION OF THE EXEMPLARY EMBODIMENTS

Figure 2:
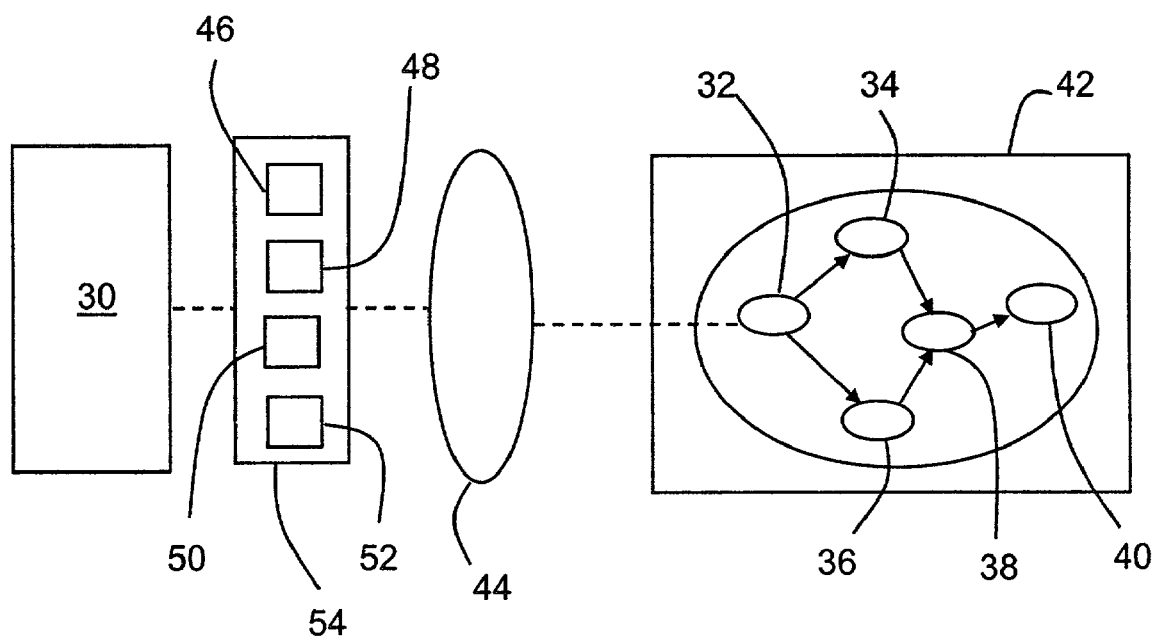
FIG. 2 is a schematic functional illustration of a method of communication according to the present invention.

Referring to FIG. 2 of the drawings that follow, there is shown a first enterprise 30 in digital communication with a second enterprise 32, which second enterprise is in digital communication with third and fourth enterprises 34, 36 respectively, each of which in turn is in communication with a fifth enterprise 38, which is in communication with a sixth enterprise 40. The second to sixth parties 32-40 respectively form a set of enterprises 42 required to complete a communication between first and second parties 2, 4 respectively.

Communication between first party 2 and second party 4 is across the internet (though it need not be), indicated schematically at 44.

Figure 1:
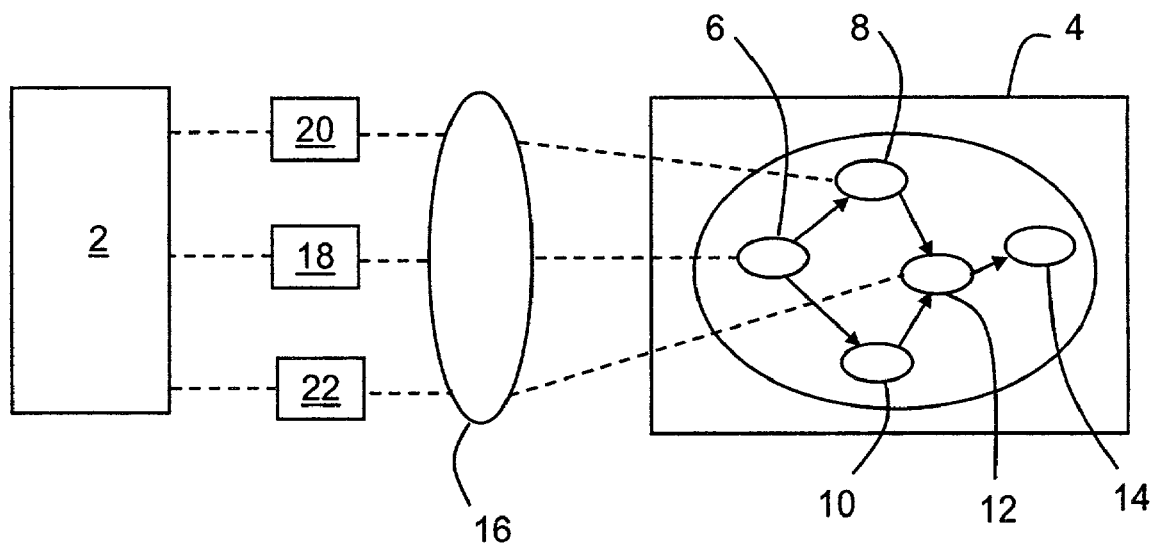
FIG. 1 is a schematic functional illustration of a method of communication as required by the prior art.

To complete the communication, second party 32 requires a first credential 46 from first party 30, third party 34 requires a second credential 48 from first party 30 and fifth party 38 requires a third credential 50 from first party 30 (as in the prior art example referred to above in relation to FIG. 1).

The first, second and third credentials 46-50 respectively are stored with a fourth credential 52 in a composite credential 54. In this embodiment, the composite credential 54 comprises a data file (e.g. a HTML form, an XML file, a WORD (trade mark) file or even just plain ASCII text) containing the first, second and third credentials 46-50 respectively. The composite credential 54 is digitally signed by the first party 30. Digital signing allows for modifications to the data to be detected and identifies who the signer was.

The composite credential 54 is sent by the first party 30 via the internet to second party 32, which extracts the required first credential 46 from the composite credential 54 and passes the composite credential 54 to third and fourth parties 34, 36 respectively along with any other information necessary for their (the third and fourth parties 34, 36 respectively), part of the communication.

Third party 34 verifies the composite credential 54 by decrypting the digital signature and extracts second credential 48 from the composite credential 54, uses second credential 48 as required, and passes the composite credential 54 along with any other information required to fifth party 38. Fourth party 36 does not require a credential and so does not need to examine the composite credential 54. Fourth party 36 passes on the required information and the composite credential 54 to fifth party 38. Fifth party 38 extracts third credential 50 from composite credential 54 and uses it as required together with the other information with which it has been supplied.

It is noted that third and fifth parties 34, 38 respectively obtain the second and third credentials 48, 50 respectively of the first party 30 from composite credential 54 without the need for them to communicate directly with the first party 30. Accordingly, the number of communication operations required to complete the communication is reduced and, performance is increased.

The fourth credential 52 is not required as part of this communication but can (with other credentials) be included in composite credential 54 as it may be of use in other communication transactions.

Thus, the first party 30 can have a single composite credential 54 for use in a plurality of communication transactions, other parties choosing the credentials they want or need from the composite credential 54 even if not all of the credentials are required for the particular communication transaction. Further the first party 30 may have a plurality of discrete composite credentials each containing a different combination of (not necessarily the same) credentials.

One or more credentials in the composite credential 54 may be obfuscated. Each credential 46-52 may be obfuscated using a different form of obfuscation. Accordingly only certain of the second to sixth parties may have the knowledge (as required) to de-obfuscate the credential(s) they require. Obfuscation may be by symmetric (e.g. Digital Encryption Standard (DES) or International Data Encryption Algorithm (IDEA)) or asymmetric (e.g. public/secret key) encryption. An alternative forms of obfuscation is data compression for instance by using WINZIP (trade mark). Obfuscation of the credentials 46-52 enhances security. Thus, while obfuscation preferably involves encryption, it need not.

Each party upon receipt of composite credential 54 may pass on (i) the original composite credential 54, (ii) a version excluding the credential the transmitting party has used (this requires knowledge on the part of the transmitting party that the receiving party and any subsequent using party will not need the excluded credential), (iii) a version with one or more previously obfuscated credentials de-obfuscated (which reduces the security of the method, but also reduces processing requirement for subsequent parties so may be appropriate, for instance, where the subsequent parties are within the same organization as the transmitting party) or (iv) a version with additional data added. If a modified composite credential is transmitted, the modifier will digitally sign the modified data.

Further, de-obfuscation of a credential may be dependent on de-obfuscation of a preceding credential. For instance, by way of example, a first credential 46 is obfuscated using a first key known to the second party 32 only. The second credential 48 is obfuscated by a second key, which second key requires knowledge of the first key. For instance, a session key for the second credential may be embedded in the obfuscated first credential. Even when de-obfuscated from the first credential, the session key for the second credential may remain obfuscated, to be de-obfuscated by the third party.

Only the third party 34 has the knowledge to read the obfuscated second credential 48, but the knowledge it has is only sufficient if it has received the de-obfuscated first credential 46. Once it has done so it can de-obfuscate the second credential and use it as required. This enveloping of credentials can be used as many times as desired to control the order in which parties subsequent to the first party 30 can access the credentials.

The composite credential 54 will usually be digitally signed to validate it as having been signed by a recognized party and enable the recipient to establish whether it has been modified at all. The composite credential 54 may be digitally signed by each party before transmission to validate the source and content thereof. This can also be used to maintain an audit trail for the composite credential 54. However, composite credentials (and credentials within the composite credentials) that are not digitally signed also fall within the scope of the present invention.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

The invention claimed is:

1. A method of communicating credentials, the method comprising:
   a first party communicating a composite credential across a distributed electronic network to a second party wherein the composite credential comprises a plurality of obfuscated credentials in which different obfuscation is used for at least two credentials in the composite credential;
   the second party de-obfuscating at least one credential; and
   the second party communicating to a third party at least one obfuscated credential from the composite credential, wherein the third party obtains a credential of the first party from the obfuscated credential without directly communicating with the first party, wherein the first party communicates to the second party an obfuscated composite credential comprising a first credential and a second credential in which the second credential is enveloped by the first credential, wherein the obfuscated composite credential is de-obfuscated by the second party thereby to obtain the first credential and a partly de-obfuscated second credential, which partly de-obfuscated second credential is communicated by the second party to a third party.

2. A method of communicating credentials according to claim 1, wherein the second party receives a composite credential and the second party modifies the received composite credential before communicating it to the third party.

3. A method of communicating credentials according to claim 1, wherein the second party receives a composite credential and the second party communicates the received composite credential to the third party.

4. A method of communicating credentials according to claim 1, wherein all credentials are obfuscated within the composite credential.

5. A method of communicating credentials according to claim 4, in which different obfuscation is used for each obfuscated credential in the composite credential.

6. A method of communicating credentials according to claim 1, wherein the composite credential comprises a first credential and a second credential in which the second credential is enveloped by the first credential.

7. A method of communicating credentials according to claim 1, wherein the third party de-obfuscates the party de-obfuscated second credential.

8. A method of communicating credentials according to claim 1, wherein the composite credential is obfuscated.

9. A method of communicating credentials according to claim 8, wherein the composite credential is at least partly obfuscated, and wherein the second party de-obfuscates a relevant credential.

10. A method of communicating credentials according to claim 1, wherein at least one credential is digitally signed.

11. A method of communicating credentials according to claim 10, wherein a plurality of credentials is digitally signed.

12. A method of communicating credentials according to claim 10, wherein all credentials in the composite credential are digitally signed.

13. A method of communicating credentials according to claim 1, wherein the composite credential is digitally signed.

14. A method of communicating credentials according to claim 1, in which the distributed electronic network is the internet.

* * * * *